Jan. 5, 1937.  L. W. BOWEN  2,066,436
PROJECTION SYSTEM
Filed May 24, 1930   3 Sheets-Sheet 1

INVENTOR
Lester W. Bowen
BY
Ward, Crosby & Neal
ATTORNEYS

Jan. 5, 1937. L. W. BOWEN 2,066,436
PROJECTION SYSTEM
Filed May 24, 1930 3 Sheets-Sheet 2

INVENTOR
Lester W. Bowen
BY
Ward, Crosby & Neal
ATTORNEYS

Jan. 5, 1937. L. W. BOWEN 2,066,436
PROJECTION SYSTEM
Filed May 24, 1930 3 Sheets-Sheet 3

INVENTOR
Lester W. Bowen
BY
Ward, Crosby & Neal
ATTORNEYS

Patented Jan. 5, 1937

2,066,436

UNITED STATES PATENT OFFICE 2,066,436

PROJECTION SYSTEM

Lester W. Bowen, Larchmont, N. Y., assignor to Trans-Lux Daylight Picture Screen Corporation, New York, N. Y., a corporation of Delaware Application May 24, 1930, Serial No. 455,195

15 Claims. (Cl. 88—24)

My invention relates to a projection system and has particular reference to the light reflecting or mirror arrangement of such a system.

My invention, as regards an important phase thereof, relates to a projection system including a screen traversed horizontally by images and positioned cross-wise with respect to the course taken by a character-bearing tape while passing through the projection field.

My invention, as regards another important phase thereof, relates to a projection system including a plurality of screens disposed cross-wise and more particularly at right angles with respect to the course taken by a character-bearing tape while passing through the projection field.

Various other features, advantages and characteristics of my invention will become apparent from the following detailed description taken in connection with the accompanying drawings.

For an understanding of my invention and for an illustration of one of the many forms thereof, reference is to be had to the accompanying drawings, in which.

As hereinbefore generally stated, my invention relates particularly to the light reflecting or mirror arrangement of any suitable projection system. In order that there may be a full disclosure of a system of the character stated, I have herein illustrated and described an image-forming system of the character disclosed in the copending application of Edward H. Unkles, Serial No. 435,155, filed March 12, 1930, wherein a particular arrangement is disclosed for simultaneously obtaining plural images of the same tape character. It shall be understood, however, that as regards certain broad aspects, my invention is not to be limited to the just described arrangement of the aforesaid Unkles application.

When practicing my invention and as shown on the accompanying drawings, there may be utilized any suitable source of light S such, for example, as a lamp bulb having a filament $a$ adapted to be brought to incandescence. A suitable reflector R may be associated with the light source S so as to cooperate therewith to produce light of relatively great intensity which, as a beam of light, traverses any suitable condensing lens system herein shown as comprising the spaced condensing lenses C and Ca.

As shown although not necessarily, a suitable light-reflecting surface, as an ordinary plane mirror M, may be disposed between the condensing lenses C and Ca to change the direction taken by the light beam after passage thereof through the condensing lens C.

After leaving the condensing lens Ca, the light beam generated by the light source S passes through any suitable representation or character-bearing surface which, as herein shown, is a transparent or semi-transparent "ticker" tape T such as issues from stock "ticker" mechanism of any suitable type after characters indicative of stock quotations have been printed longitudinally thereon as well understood in the art. The tape T, under the influence of any suitable mechanism, not shown, is moved under more or less tension transversely of the path taken by the aforesaid light beam after emergence thereof from the condenser lens Ca. During such movement, the tape T is supported by any suitable frame or member $b$ having an elongated slot $c$, Figs. 3 and 4, which forms the projection field or picture aperture.

In accordance with the disclosure of the aforesaid Unkles application, the light beam, preferably after coaction with the tape T, passes through any suitable objective lens O whereby images are formed of those tape characters within the projection field.

Figure 1:
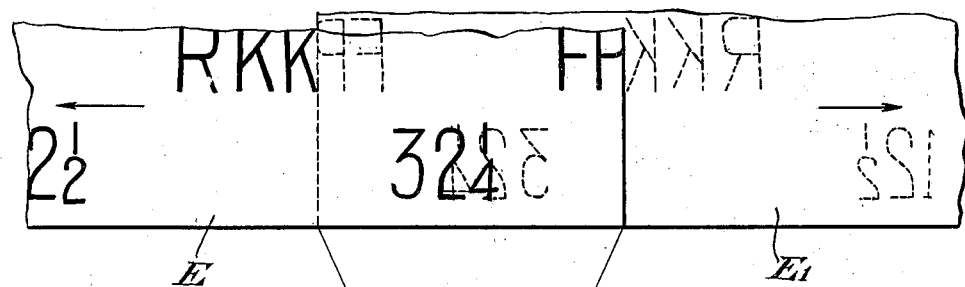
Figure 1 is a diagrammatic view of a projection system arranged in accordance with my invention.
Figure 1:
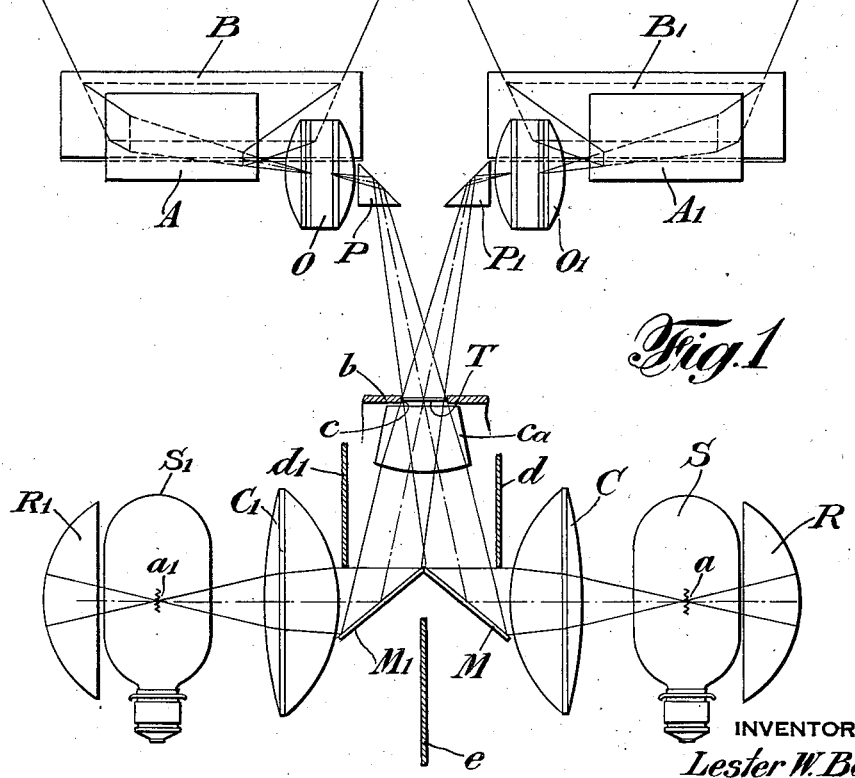
Figure 2:
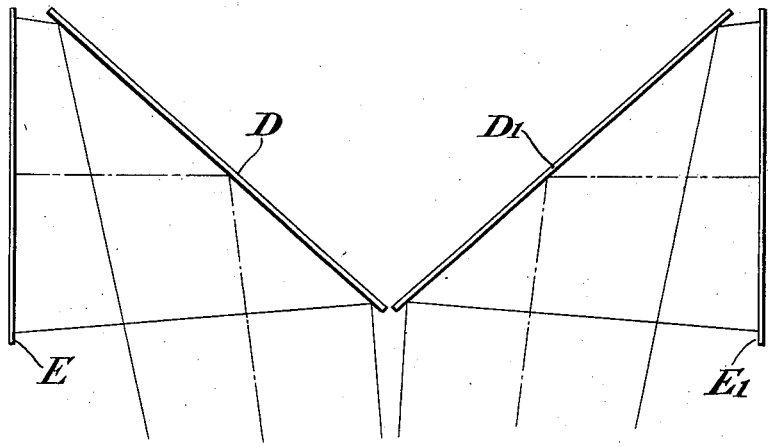
Fig. 2 is a side view of the projection system shown in Fig. 1.
Figure 2:
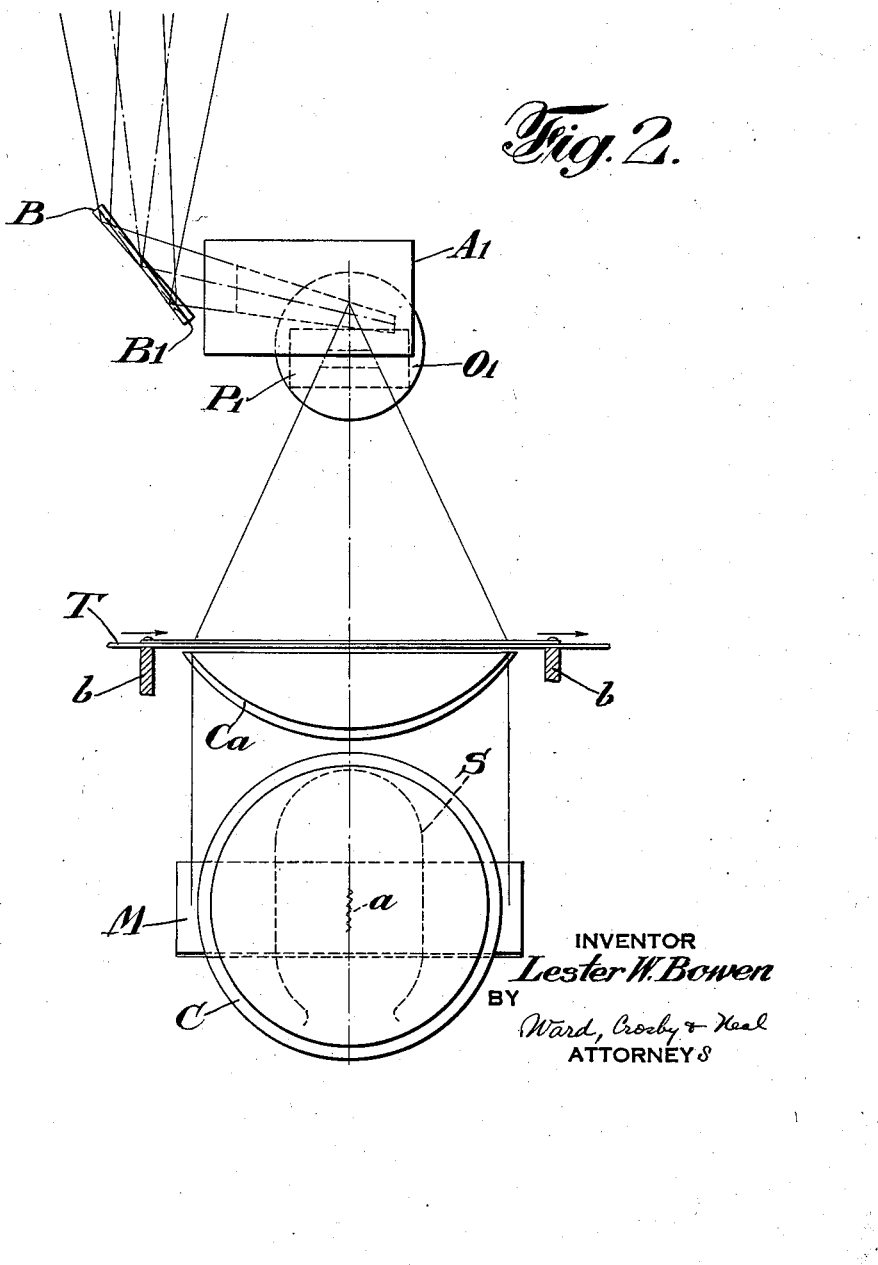

With the form of my invention herein disclosed, the aforesaid light beam, after leaving the tape T, coacts first with a prism P or other suitable light-reflecting surface whereby said light beam is caused to pass substantially in a horizontal direction, Figs. 1 and 2. As shown although not necessarily, the light beam, after leaving the prism P, traverses the objective lens O and then coacts in succession with the mirrors A, B and D, said light beam passing from the mirror D to a screen E of the character utilized, in the example shown, in "rear" projection or projection of that character wherein the light beam passes through the screen to reach one or more persons viewing said screen.

As illustrated herein, the frame $b$ is substantially horizontally disposed to cause similar disposition of that section of the tape T defined or framed thereby. The light beam passes from the light source S and is reflected by the mirror M and prism P. However, between the light source S and the mirror A, the optical axis of the light beam is at right angles or substantially so with respect to the course taken by the tape T while passing through the projection field. In accordance with one form of my invention, the mirror A is so disposed that the light beam is deflected along such a path that the optical axis of the light beam becomes parallel or substantially so with respect to the aforesaid course of the tape T during projection, Fig. 3. Thereafter, said light beam is directed upwardly by the mirror B, then horizontally and finally coacts with the screen E which is disposed substantially vertically and, in accordance with one form of my invention, is at right angles or substantially so with respect to the aforesaid course of the tape T during projection.

Figure 3:
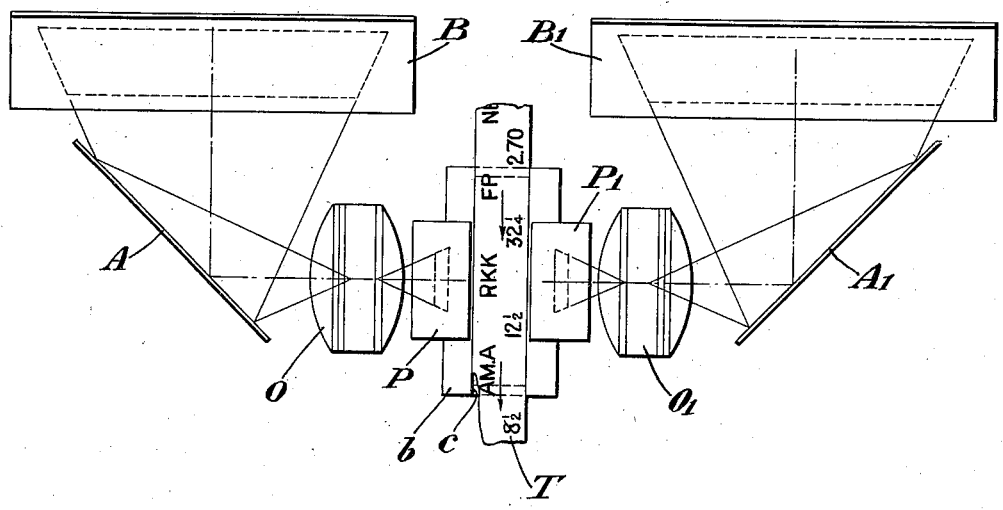
Fig. 3 is a plan view, partly broken away, of a part of the system shown in Figs. 1 and 2.
Figure 4:
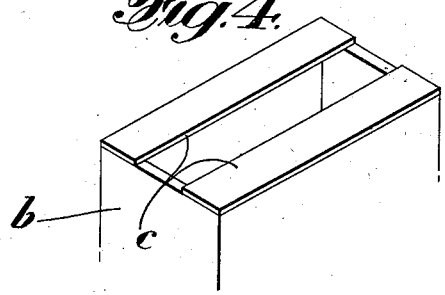
Fig. 4 is a perspective view of a tape support defining or forming a projection field or picture aperture.

Accordingly, for any given position of the tape T, there are obtained on the screen E images of those characters on said tape T which are defined by or within the enclosure of the frame b. As the tape T moves, the characters thereon enter the frame b at one end thereof, move thereacross, and leave at the other end thereof. As a result, the character images move across the screen E in correspondence with the tape movement, said images appearing at one end of said screen E, moving thereacross, and leaving at the other end thereof. As shown in Fig. 3, the characters on the tape T face upwardly or, in other words, they are printed on the top surface of said tape T in such manner that they are readable in the normal manner when looking down on the tape. Under such circumstances, the use of a reflecting system of the character shown causes the character images to appear on the screen E in proper sequence, upright and otherwise in the proper observing position.

Thus, in accordance with the form of my invention herein disclosed, the screen E is disposed in a plane crosswise with respect to the course taken by the tape while moving through the projection field and the images on the screen travel from end to end thereof substantially parallel with respect to the plane of that tape section in the projection field.

In accordance with another phase of my invention, plural images of each tape character are obtained on screens or the like disposed in suitable relation with respect to each other. To this end and as herein illustrated but not necessarily, duplicate light-reflecting systems are provided in which case the screens, preferably, are disposed in spaced, non-alined back-to-back relation as shown particularly in Fig. 1.

In accordance with the disclosure of the aforesaid Unkles application, duplicate image-forming systems may be utilized and associated, respectively, with the aforesaid duplicate light-reflecting systems. Accordingly, to simplify the description, the different elements of the second image-forming and light-reflecting system have been given reference characters the same as hereinbefore used with the exception that the numeral "1" is appended in each case.

Consonant with the description thus generally stated and as shown on the drawings, the two image-forming systems are similar and distinct with the exception of the common condensing lens Ca. They are symmetrically disposed in the sense that the axis of the light beams emanating directly from the respective light sources S and S1 may be defined by the same straight line, said light beams passing toward each other and being intercepted by the respective mirrors M and M1. By the latter, the aforesaid light beams are deflected upwardly and traverse the common condensing lens Ca whereupon both light beams simultaneously pass through the same section of the tape T.

As clearly appears from Fig. 1, the mirrors M and M1 are so positioned that the respective light beams cross and, in angular relation with respect to each other, pass to the respective prisms P and P1 beyond which, the light beams traverse the respective objective lenses O and O1. As stated, the light-reflecting systems may be duplicates and as herein shown, the corresponding parts of each are arranged in the same relation. Accordingly, the light beam emanating from the source of light S1, after traversing the objective lens O1, coacts with the mirror A1, then with the mirrors B1 and D1 in succession, and finally comes into engagement with the screen E1.

As shown in Figs. 1 and 3, the mirrors B and B1 are disposed in spaced, side-by-side relation and, as shown in Fig. 2, said mirrors B and B1 are inclined to different degrees with respect to a horizontal plane. This arrangement is provided so as to cause the light beams to be angularly related to a desired degree after they leave the respective mirrors B and B1 whereby they pass upwardly and engage the respective mirrors D and D1. By the latter, the respective light beams are deflected in opposite directions, although this may be varied, if desired, to bring them into co-action, respectively, with the oppositely facing screens E and E1 which, ordinarily, are vertically disposed.

Where an arrangement of the character hereinbefore described is utilized, there simultaneously appears an image of each character on the tape T within that part thereof defined by the frame b, and these images move across each screen, respectively, in correspondence with the tape movement, the images on one screen moving in one direction and the images on the other screen moving in reverse direction.

The screens E and E1 may be positioned as desired for observation of the images thereon. As shown, although not necessarily, said screens face in opposite directions and, therefore, a person observing the screen E, for example, is not in a position for direct observation of the screen E1. An arrangement such as just described is adapted particularly for use in stock brokers' offices where the screens E and E1 face into or are disposed in opposite rooms in which case, the light beam coacting with one of the screens may pass through a wall separating the rooms. However, it shall be understood that my invention is not to be limited to the screen arrangement described above since, for example, one of the screens may be disposed in a plane cross-wise with respect to the course taken by the tape on moving through the projection field and the other screen may be disposed in a plane parallel with respect to said course of the tape. Under such circumstances, ordinarily, the light-reflecting systems are not duplicates and, moreover, duplicate light-reflecting systems need not be utilized with the form of my invention hereinbefore described.

An arrangement of the character described, i. e., where the screens are disposed back to back and, respectively, in planes cross-wise to the course taken by the tape while passing through the projection field is highly advantageous because of the resulting compact nature of the installation while still obtaining the required light path lengths so that there may be adequate size of the screen image areas.

With a light beam projecting arrangement of the character illustrated in Fig. 1, a suitable shielding arrangement should be employed to restrict or define the paths for the light beams from the respective light sources. In the example shown, such shielding arrangement comprises a plurality of light-opaque members $d$, $d1$ and $e$ corresponding in length with that of the mirrors M, M1. As illustrated, the member $d$ is so positioned that the lower surface thereof is in alinement with the upper surface of mirror M1 whereas the upper surface of said member $d$ extends at least as far as the lower surface of the condensing lens $Ca$. Accordingly, the member $d$ so restricts the light path that such light as comes within the region between the mirror M and the condensing lens $Ca$ is that which is reflected by said mirror M. The member $d1$ functions in a manner similar to that just described with respect to the member $d$ and, therefore, defines the upper edge of the path taken by light emerging from the source S1. The member $e$ is adapted to intercept light which would otherwise pass in either direction below the mirrors M, M1. Accordingly, the upper surface of member $e$ should be disposed at least as high as the lower surface of either of said last named mirrors and said member $e$ should extend a suitable distance below the mirrors.

While my invention has been described in connection with ordinary "ticker" tape, it shall be understood that any suitable surface or member may be utilized in lieu thereof, and that such "ticker" tape, member or surface may bear or have printed thereon any suitable indicia, representations, characters, or the like, hereafter in the appended claims generically termed a "character" or "characters".

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system, the combination with a projection field along which is movable a tape having characters reading lengthwise thereof, of a plurality of screens disposed, respectively, in planes cross-wise with respect to the course taken by the tape while moving through said projection field, and means comprising light-reflecting systems for producing on the respective screens character images which travel from end to end thereof substantially parallel with respect to the plane of the tape section in said projection field.

2. In a projection system, the combination with a projection field along which is movable a tape having characters reading lengthwise thereof, of a plurality of screens disposed, respectively, in planes cross-wise with respect to the course taken by the tape while moving through said projection field, and means comprising light-reflecting systems for producing on the respective screens character images which travel horizontally from end to end thereof substantially at right angles with respect to the direction of movement of the tape section in said projection field.

3. In a projection system, the combination with a projection field along which is movable a tape having characters printed and readable lengthwise thereof, of a plurality of screens disposed, respectively, in planes cross-wise with respect to the course taken by the tape while moving through said projection field, and means comprising light-reflecting systems for producing on the respective screens character images which travel horizontally from end to end thereof in correspondence with the tape movement.

4. In a projection system, the combination with a projection field along which is horizontally movable a tape disposed flat-wise and having characters printed thereon which face upwardly, of a plurality of screens vertically disposed, respectively, in planes cross-wise with respect to the course taken by the tape while moving through said projection field, and means comprising light-reflecting systems for producing on the respective screens character images which travel horizontally in correspondence with the tape movement.

5. In a projection system, the combination with a projection field along which a character-bearing tape is movable, of a plurality of spaced screens disposed, respectively, in planes extending cross-wise with respect to the course taken by the tape while moving through said projection field, and means comprising light-reflecting members for producing on the respective screens character images disposed in normal upright position.

6. In a projection system, the combination with a projection field along which a character-bearing tape is movable, of a plurality of spaced screens disposed in substantially parallel relation, and means comprising light-reflecting members for producing on the respective screens character images disposed in normal upright position, a given tape section during movement along said projection field moving horizontally and substantially at right angles with respect to the planes of said screens.

7. In a projection system, the combination with a projection field along which a character-bearing tape is movable, of a plurality of spaced screens disposed, respectively, in planes substantially at right angles with respect to the course taken by the tape while moving through said projection field, and means comprising duplicate light-reflecting systems for producing on the respective screens character images disposed in normal upright position.

8. In a projection system, the combination with a projection field along which is movable a tape having characters reading lengthwise thereof, of a plurality of spaced screens disposed, respectively, in planes substantially at right angles with respect to the course taken by the tape while moving through said projection field, and means comprising duplicate light-reflecting systems for producing on the respective screens character images disposed in normal upright position and which travel horizontally from end to end of said screens.

9. In a projection system, the combination with a projection field along which is movable a tape having characters reading lengthwise thereof, of a plurality of spaced screens disposed, respectively, in planes substantially at right angles with respect to the course taken by the tape while moving through said projection field, and means comprising duplicate light-reflecting systems for simultaneously producing on the respective screens images of the characters on that tape section in said projection field at any given time, said images being disposed in normal upright position and traveling in opposite directions along the respective screens in correspondence with the tape movement.

10. In a projection system, the combination with a projection field for a character-bearing tape, of a plurality of spaced screens disposed cross-wise with respect to the tape path through the projection field, and means comprising duplicate light-reflecting systems for producing on the respective screens character images disposed in normal upright position.

11. In a projection system, the combination with a projection field for a character-bearing tape, of a plurality of spaced screens disposed cross-wise with respect to the tape path through the projection field, and means comprising duplicate light-reflecting systems for producing on the respective screens character images disposed in normal upright position, each of said light-reflecting systems comprising a pair of spaced reflecting surfaces having an objective lens disposed therebetween.

12. In a projection system, the combination with a projection field with respect to which is movable a tape having characters reading lengthwise thereof, of a plurality of spaced substantially parallel screens disposed in back-to-back relation, and means comprising duplicate light-reflecting systems for producing on the respective screens character images disposed in normal upright position and which travel substantially horizontally in correspondence with movement of the tape.

13. In a projection system, the combination with a projection field with respect to which is movable in horizontal, flat-wise relation a tape having characters reading lengthwise thereof, of a plurality of screens disposed, respectively, in planes extending cross-wise with respect to the course taken by the tape while moving through said projection field, and means comprising light-reflecting systems for producing on the respective screens upright images of the tape characters which travel substantially horizontally in correspondence with the movement of said tape.

14. In a projection system, the combination with a projection field with respect to which is movable a tape having characters reading lengthwise thereof, of a plurality of spaced substantially parallel screens disposed in back-to-back relation, and means comprising duplicate light-reflecting systems for simultaneously producing on the respective screens duplicate character images disposed in normal upright position and which travel substantially horizontally in correspondence with movement of the tape.

15. In a projection system, the combination with a projection field with respect to which is movable a tape having characters reading lengthwise thereof, of a plurality of spaced substantially parallel screens disposed in back-to-back relation, and means for simultaneously producing on the respective screens duplicate character images disposed in normal upright position and which travel substantially horizontally in correspondence with movement of the tape, the light path between said projection field and each of said screens being transparent at all times to the passage of the projecting light beam.

LESTER W. BOWEN.